United States Patent
Kim

(10) Patent No.: US 7,184,484 B1
(45) Date of Patent: Feb. 27, 2007

(54) METHOD AND APPARATUS FOR SERIAL DATA COMMUNICATION

(75) Inventor: Jea-Seong Kim, Kumi (KR)

(73) Assignee: LG Electronics Inc., Seoul (KR)

( * ) Notice: Subject to any disclaimer, the term of this patent is extended or adjusted under 35 U.S.C. 154(b) by 781 days.

(21) Appl. No.: 09/612,545

(22) Filed: Jul. 7, 2000

(30) Foreign Application Priority Data

Jul. 7, 1999 (KR) ................ 1999-27295

(51) Int. Cl.
*H04B 3/00* (2006.01)

(52) U.S. Cl. .............. 375/257; 375/354; 375/284; 375/321; 375/438

(58) Field of Classification Search ............... 375/257, 375/354, 401, 366; 327/65; 370/321, 401, 370/366, 284, 438; 340/146.1; 364/900
See application file for complete search history.

(56) References Cited

U.S. PATENT DOCUMENTS

| | | | | |
|---|---|---|---|---|
| 4,186,379 A | * | 1/1980 | Knoblock et al. | 714/699 |
| 4,584,684 A | | 4/1986 | Nagasawa et al. | |
| 4,617,423 A | * | 10/1986 | Dickerson et al. | 178/2 R |
| 4,750,165 A | | 6/1988 | Champagne et al. | |
| 4,811,279 A | * | 3/1989 | Bean et al. | 710/305 |
| 5,339,316 A | * | 8/1994 | Diepstraten | 370/401 |
| 6,002,733 A | | 12/1999 | Kim | |
| 6,285,723 B1 | * | 9/2001 | Yamada et al. | 375/354 |
| 6,445,700 B1 | * | 9/2002 | Yusa et al. | 370/366 |
| 6,650,149 B1 | * | 11/2003 | Wong | 327/65 |

FOREIGN PATENT DOCUMENTS

WO  WO9923787  5/1999

OTHER PUBLICATIONS

Schwartz, Feedback for Error Control and Two-Way Communication, Mar. 1963, IEEE, vol. 11, p. 49-56.*

* cited by examiner

*Primary Examiner*—Chieh M. Fan
*Assistant Examiner*—Eva Zheng
(74) *Attorney, Agent, or Firm*—Birch, Stewart, Kolasch & Birch, LLP

(57) ABSTRACT

A method and an apparatus for serial data communication employs a data transmission process which transmits data from one control unit to the another control unit and at the same time checks a reception confirmation signal on each number of the data by transmitting a clock signal, and a data reception process which receives the data on the one control unit from the other control unit and checks a transmission confirmation signal on the each number of the data by transmitting the clock signal. The apparatus comprises a first and a second control unit, four serial buses for performing serial data communication between the both control units, two pull-up operation units for continuing control voltage of the serial buses at a certain level, and a control voltage matching unit for continuing voltage equilibrium condition.

5 Claims, 6 Drawing Sheets

METHOD AND APPARATUS FOR SERIAL DATA COMMUNICATION

BACKGROUND OF THE INVENTION

1. Field of the Invention

The present invention relates to the technology of data transmission and reception between control units through a serial bus, and in particular to a method and an apparatus for serial data communication which is capable of accurate data transmission and reception regardless of a change in circumstances by performing a two-way communication between two independent communication control units, processing a task independently by the one control unit when communication is disabled due to an abnormality of the other control unit.

2. Description of the Prior Art

In the conventional serial data transmission technology, data transmission and reception is performed under the control of a master control unit. In other words, when the data transmission and reception is performed between two control units, a clock is controlled by one master control unit. Accordingly, a slave control unit transmits and receives data in accordance with the clock which is controlled by the master control unit.

FIG. 1 and FIG. 3 illustrate normal data and transformation data which are on a bus in the conventional serial data transmission technology. FIG. 1 illustrates an example of an IM bus protocol developed by ITT, FIG. 1a illustrates normal data transmission, FIG. 1b illustrates data transformation influenced by the surrounding noise. Herein, the surrounding noise may be generated by an external symbol dictionary (ESD) or internal discharge of a color picture tube (CPT), and a signal for producing contrast 36hex data may be transformed into the signal for making contrast 16hex data due to the surrounding noise.

FIG. 2 illustrates an example of a Philips 12C bus protocol which has been used widely in recent years. FIG. 2a illustrates a normal data transmission, and FIG. 2b illustrates data transformation influenced by the surrounding noise. Data adjustment by a tuner may be considered as a countermeasure for such data transformation, but data from the other control unit may be changed due to the data adjustment by the tuner. On the 12C bus, although it is possible to check whether the slave control unit has received the data as a byte unit, an incorrect operation may be performed when the data is changed.

FIG. 3 illustrates a master control unit in a clock line occupation state or in a long communication pause state during the data transmission. At this time the slave control unit cannot perform independently.

The conventional technology has the following problems. When transmitted data from the master control unit is damaged due to the surrounding noise, the slave control unit may process the data without recognizing the damage and may perform an inaccurate operation. When the master control unit stops the data reception while receiving the data, in other words, when the master control unit holds the clock line due to its abnormality, the slave control unit cannot perform any operation. When there is a need to get information from the master control unit or to transmit information from the slave control unit, it is difficult to get the information independently without the process operation of the master control unit.

SUMMARY OF THE INVENTION

It is an object of the present invention to provide a method for serial data communication which is capable of accurate data transmission and reception regardless of a change in circumstances by performing a two-way communication between two control units having separate and independent communication control, adjusting a communication data quantity voluntarily by a definition of both control units, and performing communication between the control units which have different control voltages by complementing a circuit slightly.

To achieve the object, there is provided a method for serial data communication which transmits and receives two-way data between two control units. The method comprises a data transmission process which transmits data from a first control unit to a second control unit, at the same time checks a reception confirmation signal of the second control unit on each unit of the data by transmitting a clock signal, and a data reception process which receives the data from the second control unit by the first control unit, at the same time checks a transmission confirmation signal of the second control unit on each unit of the data by transmitting the clock signal.

When the first control unit transmits serial data to the second control unit, the data transmission process includes the steps of (a) confirming whether data was received, starting data transmission with a data transmission start signal and receiving the reception confirmation signal from the second control unit, (b) recognizing the data reception of the second control unit and reversing the transmission start signal in order to transmit the next data, (c) transmitting the transmission permission signal which informs the second control unit to transmit the next data, and (d) feedback-receiving the transmission permission signal. The data is transmitted to the second control unit by performing the steps repeatedly at certain intervals.

The data reception process includes steps of (a) receiving the first data from the second control unit and performing feedback for informing the data reception, (b) receiving a next data transmission preparation signal from the second control unit, (c) transmitting the data transmission permission signal to the second control unit, and (d) transmitting the next data on the second control unit after feedback-receiving the data transmission permission signal. The data is received from the second control unit by performing the steps repeatedly at certain times.

DETAILED DESCRIPTION OF THE PRESENT INVENTION

Figure 1A:
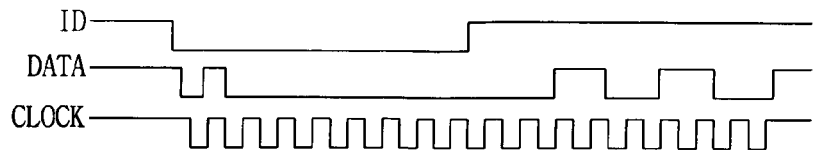
FIG. 1a is a waveform diagram illustrating an example of a normal data on an IM bus.
Figure 1B:
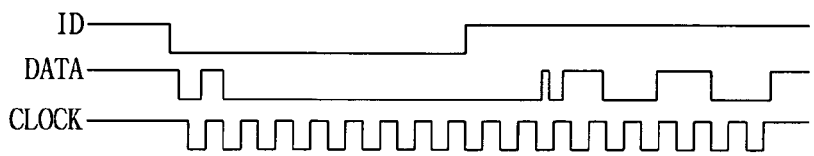
FIG. 1b is a waveform diagram illustrating data transformation on the IM bus due to surrounding noise.
Figure 2A:
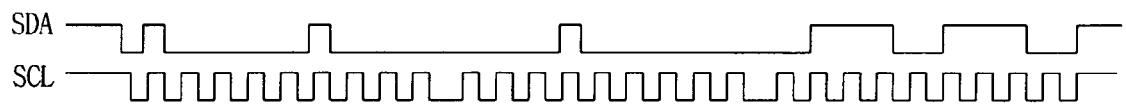
FIG. 2a is a waveform diagram illustrating a normal data on a 12C bus.
Figure 2B:
FIG. 2b is a waveform diagram illustrating the data transformation on the 12C bus due to the surrounding noise.
Figure 3:
FIG. 3 is a waveform diagram illustrating a long communication trial state or communication pause state on the 12C bus.
Figure 4:
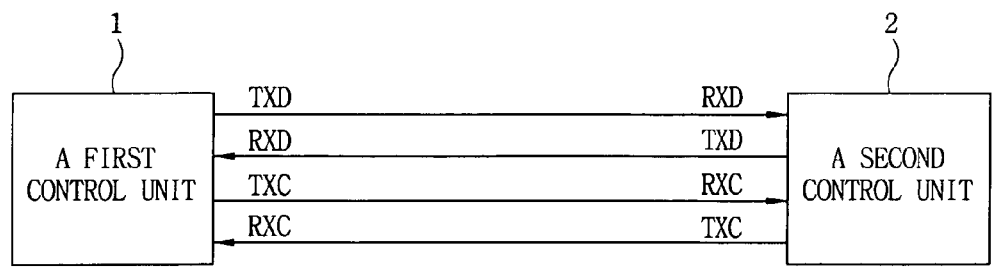
FIG. 4 is a block diagram illustrating a preferred embodiment of serial data control units of the present invention.

FIG. 4 is a schematic block diagram illustrating a serial bus line connection applied to a method for a serial data communication of the present invention. It comprises a first control unit 1 and a second control unit 2, each control unit can operate as a master control unit or a slave control unit according to need, when data is transmitted and received, both control units transmit and receive various recognition signals and confirmation signals before and after a data unit through a clock signal as a medium.

The operation of the present invention will be described in detail with reference to the accompanying FIG. 5 and FIG. 9.

FIG. 4 illustrates four bus lines installed between the first control unit 1 and the second control unit 2, TXD is data transmitted to the second control unit 2, RXD is data received on the first control unit 1, TXC is a clock signal transmitted to the second control unit 2, RXC is a clock signal received on the first control unit 1.

Herein, control units 1 and 2 are not fixed as either the master control unit or the slave control unit, but operate as the master control unit or the slave control unit according to situations described below.

Figure 5:
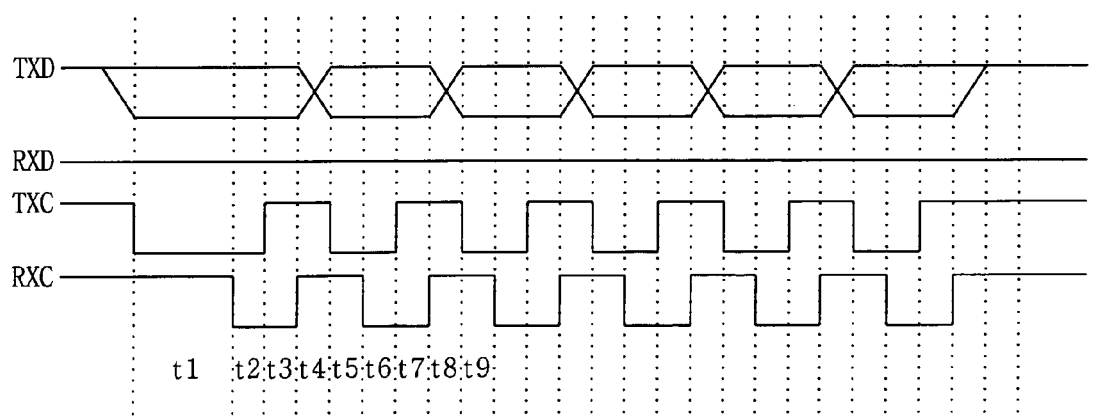
FIG. 5 is a waveform diagram illustrating a data transmission mode of the present invention.

FIG. 5 illustrates a signal waveform on each bus line for indicating a protocol applied to the present invention in a data transmission mode. On the basis of the first control unit 1, when a transmission clock signal TXC and the reception clock signal RXC are "high", the transmission data TXD starts the data transmission at the time of "low" conversion of the transmission clock signal TXC.

After the first control unit 1 outputs a transmission start signal, t1 section receives a data reception confirmation signal from the second control unit 2, and length (time) of the t1 section is set in consideration of a data processing cycle of the second control unit 2. It is advisable for the t1 section to be set at 20–70 ms according to experimental results. This is the maximum wait time considering an inputted signal cycle of a television set which is 100–120 ms at consecutive operations of a remote-controller.

After all, the t1 section is for informing of a first data transmission-reception and is a data effective section.

The t2 section converts the clock signal TXC into "high" in order to transmit the next data after the master control unit, namely, the first control unit 1 recognizes the data reception of the second control unit 2, and the t2 section (time) is set in consideration of a feedback time of the second control unit 2 after receiving and processing the data of the second communication unit 2.

The t3 section is for transmitting a signal which permits the next data transmission to the first control unit 1 on the slave control unit (the second control unit 2), the t3 section is set in consideration of the feedback time of the first control unit 1.

The t4 section is for feedback-receiving the signal which permits the next data transmission from the second control unit 2 on the first control unit 1. At this time the first control unit 1 converts the next data and transmits the converted data.

The t5 section is for receiving the data reception confirmation signal from the second control unit 2 as well as the t1 section. The t5 section is set in consideration of a feedback receiving time from the second control unit 2 because data transmission mode has started already at this point.

The t6 section performs the same function with the t2 section, t7 section performs the same function with the t4 section, and t9 section performs the same function with the t5 section. Unit sizes of transmitted data through the above process are changed freely by using the protocol between the first control unit 1 and the second control unit 2.

Figure 6:
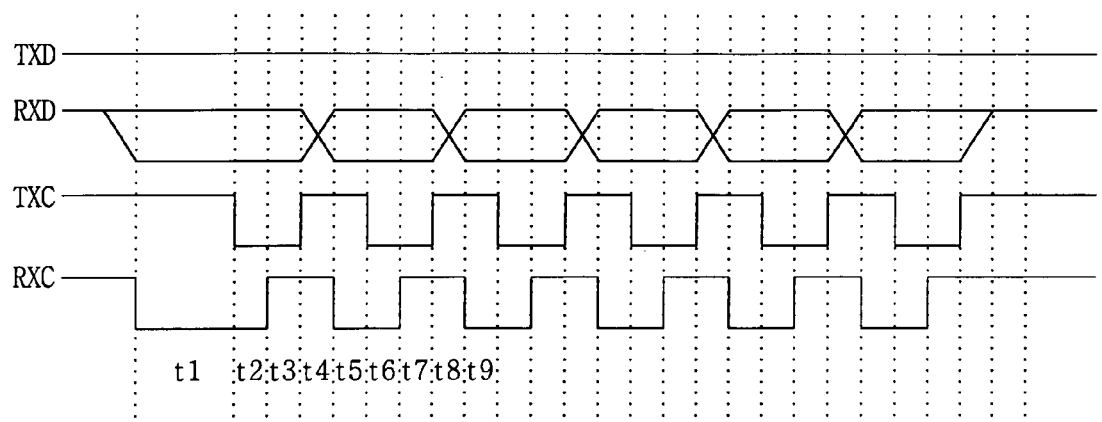
FIG. 6 is a waveform diagram illustrating a data reception mode of the present invention.

FIG. 6 is a waveform diagram at the data reception mode illustrating signal waveforms on each bus line in order to indicate the protocol applied to the present invention. On the basis of the first control unit 1, at the data reception mode, when the reception clock signal RXC and the transmission clock signal TXC are "high", the data reception is started at the time of "low" conversion of the reception clock signal RXC. On the contrary, with the above reception mode, a feedback signal is transmitted through the clock signal TXC in accordance with the clock signal RXC received from the second control unit 2.

The t1 section receives a first data from the second control unit 2 and feedback-performs the first data reception through the transmission clock signal TXC, and the t2 section converts the clock signal RXC into "high" on the second control unit 2 in order to indicate preparation of the next data transmission.

The t3 section is for transmitting a transmission permission signal to the second control unit 2 through the transmission clock signal TXC. The t4 section is for transmitting the next data after receiving the transmission permission signal on the second control unit 2.

The t5 section is for receiving and feedback-performing likewise the t1 section. A length of the t5 section is set in consideration of the feedback receiving time of the second control unit 2 because the data reception mode has started already at this point.

The t6 section performs the same function with the t2 section, the t7 section performs the same function with the t3 section, the t8 section performs the same function with the t4 section, and the t9 section performs the same function with the t5 section. Unit sizes of the received data through the above process are changed freely by using the protocol between the first control unit 1 and the second control unit 2.

Figure 7:
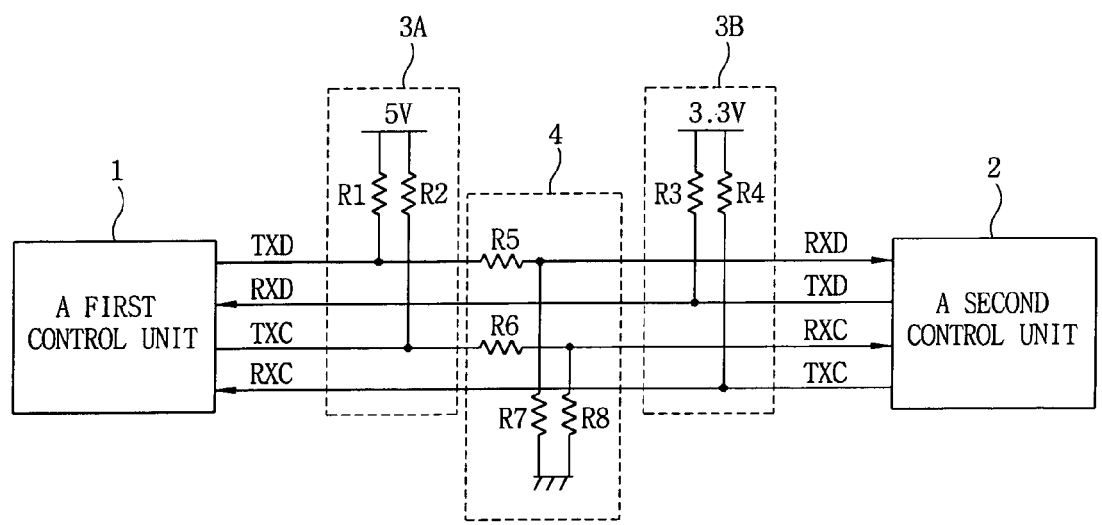
FIG. 7 is a circuit diagram of control voltage matching for bus lines of the present invention.

FIG. 7 illustrates both control units and added pullup-pulldown circuits for communicating smoothly when a control voltage level of the control units is different. For example, when the first control unit 1 uses 5V, recognizes 3–5V as "high" and 0–0.7V as "low", the second control unit 2 uses 3.3V, recognizes 2–3V as "high" and 0–0.7V as "low". In this case the first control unit 1 controls the voltage of the TXD bus line and the TXC bus line. In other words, when the pullup resistance R1 and R2 are connected between the power terminal 5V and the TXD,TXC bus lines of the first control unit 1, the first control unit 1 keeps the voltage balance through a control voltage matching unit 4.

Levels of the reception data and the clock signal RXD, RXC of the second control unit 2 are made the same as levels of the reception data and the clock signal RXD, RXC of the first control unit 1 by the control voltage matching unit 4 including resistance R5, R6 serial-connected to the TXD, TXC bus lines which connects the other connection point of the resistance R5, R6 to a ground terminal through resistance R7, R8.

Figure 8A:
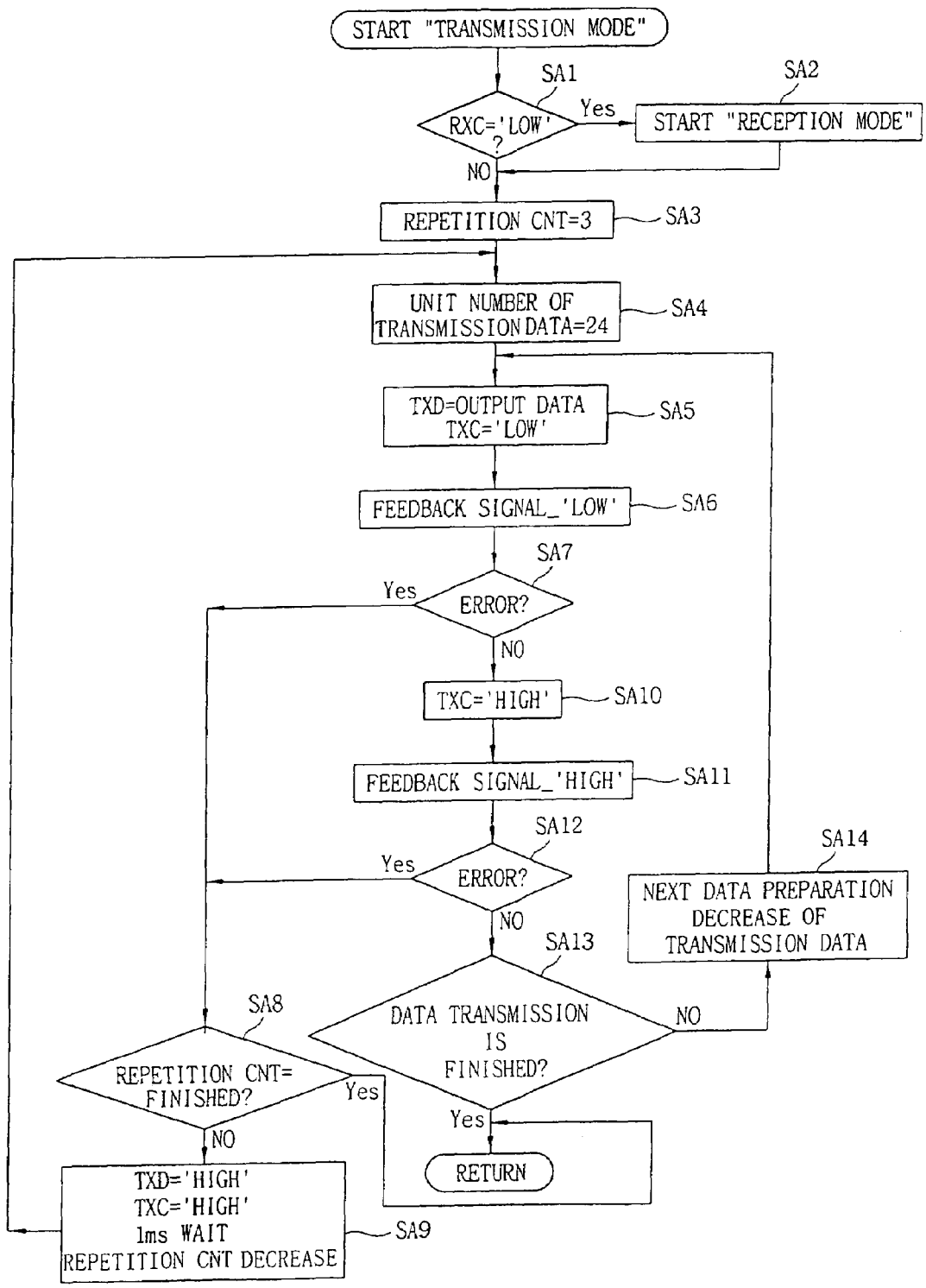
FIGS. 8a–8c are flow charts illustrating a method for serial data transmission control of the present invention.
Figure 8B:
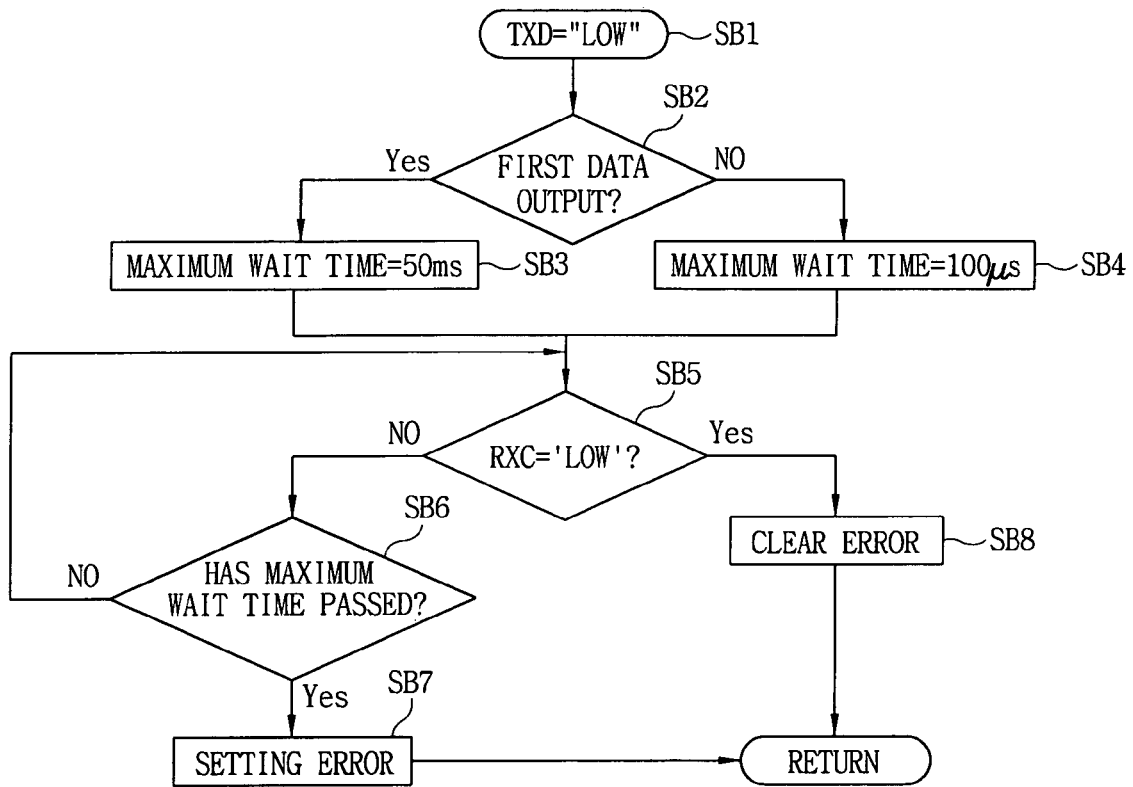
Figure 8C:
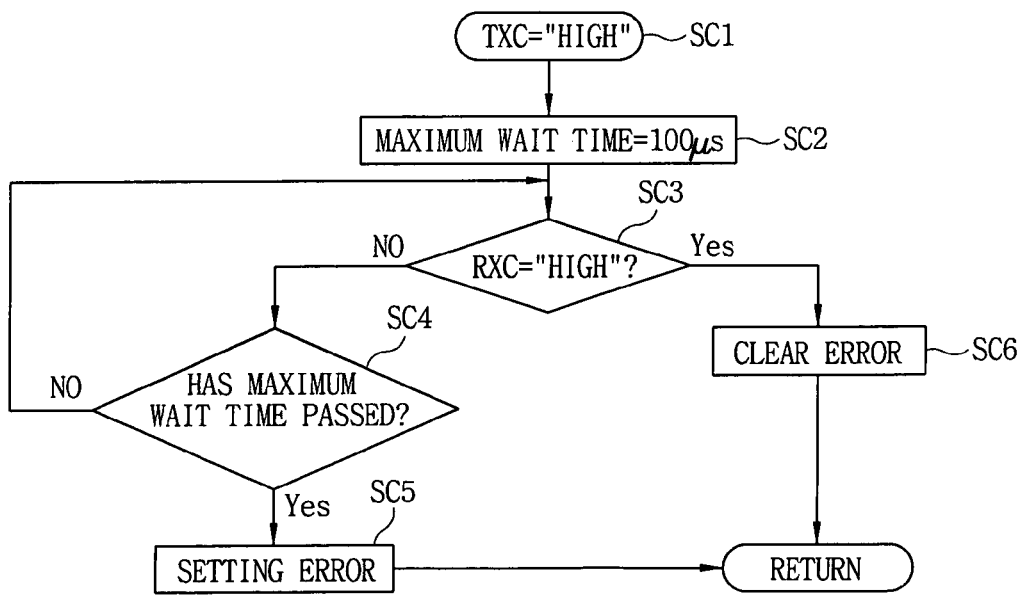

Meanwhile, FIGS. 8a–8c are signal flow charts of the data transmission mode of the present invention. A method for the serial data transmission of the present invention will be described with reference to the accompanying FIGS. 8a–8c. First, when the transmission mode is started as depicted in FIG. 8a, the first control unit 1 confirms whether the data is transmitted from the second control unit 2, when the transmitted data is confirmed, in other words, the reception clock signal RXC is "low", the first control unit 1 reception-processes the transmitted data, and transmits the data (SA1, SA2).

When the data transmission fails, re-transmission is performed, a repetition count is set at three in the present example (SA3).

Number of the data TXD unit is set at 3 bytes, namely, 24 bits are set as the size of the data unit in the present invention (SA4).

When the preparation process as above is completed, the clock signal TXC is set "low", and the transmission data TXD is transmitted to the second control unit 2 (SA5).

After transmitting the transmission data TXD, it is confirmed whether a feedback signal from the second control unit 2 is inputted within a certain time. When the feedback signal is inputted, normal data transmission is confirmed, when the feedback signal is not inputted, transmission error is confirmed (SA6, SA7).

When the transmission error occurrence is confirmed, the transmission operation is instantly stopped, it is confirmed whether the repetition count is all counted, when the count is all counted, the transmission process returns to the first, when the repetition count is not all counted. After waiting a certain period (1 ms) returns to said (d) process, and re-transmission is performed (SA8, SA9).

But, when the transmission error does not occur, after converting the transmission clock signal TXC into "high" in order to transmit the next transmission data TXD, a feedback signal is checked in order to confirm reception standby of the other communication unit (SA10, SA11).

As a result of the confirmation, when the feedback signal is inputted, normal data transmission is confirmed. When the feedback signal is not inputted, the transmission error occurrence is confirmed and re-transmission is performed by proceeding with the above SA8, SA9 process (SA12).

When the normal data transmission is confirmed, it is confirmed whether the data is all transmitted. When all the data transmission is confirmed, the transmission process returns to the first, when there is remaining data to be transmitted, after preparing the next data, returning to the SA5 process, and the above process is repeated (SA13, SA14).

FIG. 8b illustrates a routine for checking a feedback signal input from the second control unit 2 after transmitting the transmission data TXD when the transmission clock signal TXD is "low". A time for receiving a feedback signal from the second control unit 2 after the first data output and a time for receiving the feedback signal from the second control unit 2 after consecutive outputs are set. In the present example, maximum 50 ms at first, after that a maximum 100 µs are set (SB1–SB4).

When the reception clock signal RXC as the feedback signal is not converted into "low" in the given time, an error flag is set for error processing. When the RXC is converted into "low" in the given time, the error flag is cleared (SB5–SB8).

FIG. 8c illustrates a check routine which receives the feedback signal from the second control unit 2 for preparing the next data after outputting the transmission clock signal TXC when the TXC is "high". First, a time for receiving the feedback signal from the second control unit 2 is set. In the present example, maximum 100 µs for receiving the feedback signals are set (SC1, SC2).

When the reception clock signal RXC as the feedback signal is not converted into "high" in the given time, an error flag is set for error processing, when the reception clock signal RXC is converted into "high" in the given time, the error flag is cleared (SC5–SC6).

Figure 9:
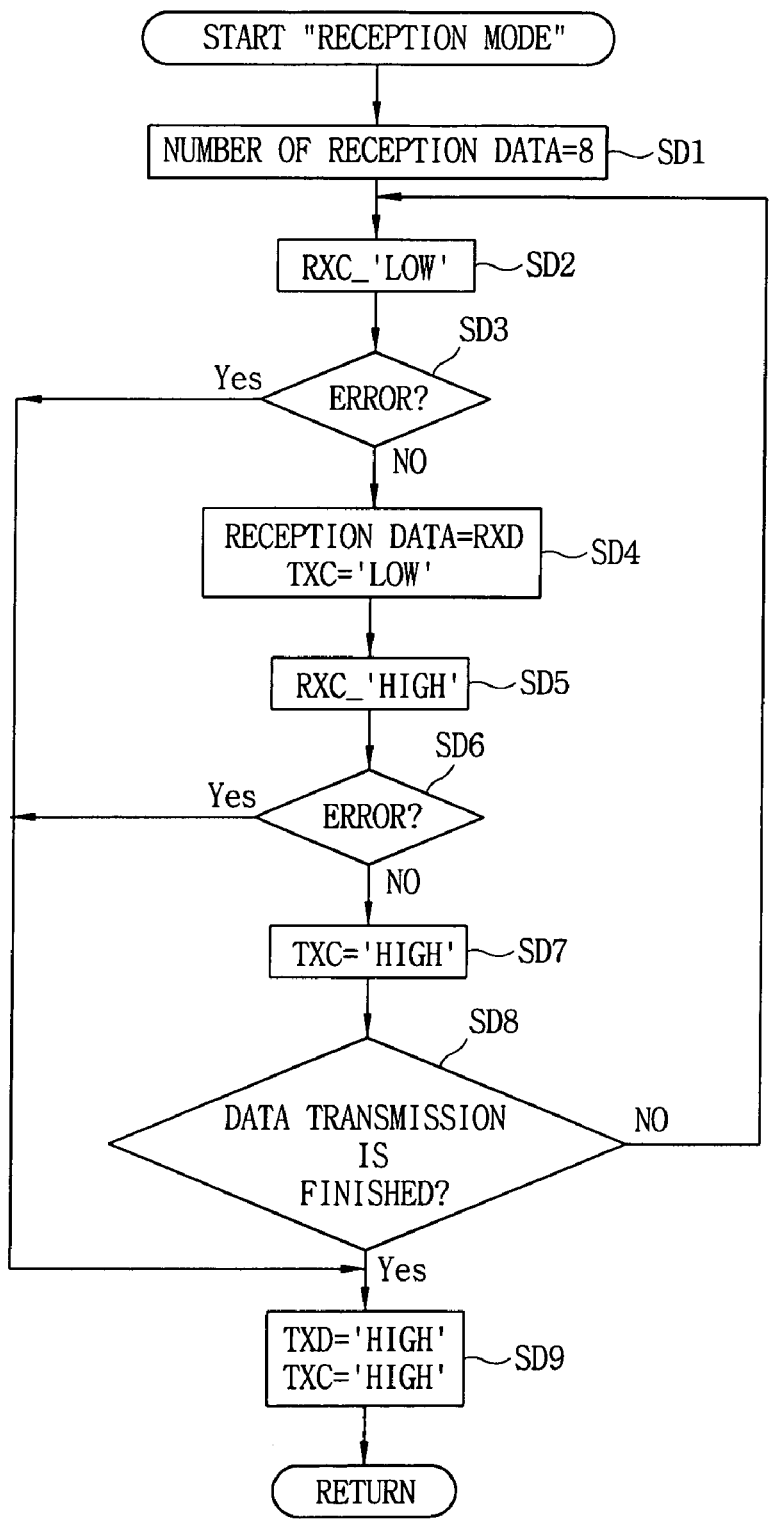
FIG. 9 is a flow chart illustrating the method for serial data reception control of the present invention.

Meanwhile, FIG. 9 is a signal flow chart of the data reception mode of the present invention. The method for serial data reception of the present invention is described with reference to the accompanying FIG. 9. Herein, an example of 1 byte (8 bit) data reception processing is described below.

When the reception process is started, a number of bits (eight) of reception data is set, the reception clock signal RXC is checked whether it is "low". When "low" is not detected in the given time, the error processing is performed (SD1–SD3, SD9). But, when "low" is detected, the data reception is performed because the data is effective, the check operation is performed repeatedly in order to increase reliability of data reception (SD4). After the data reception, a feedback of the transmission clock signal TXC is performed, the clock signal TXC becomes the reception clock signal RXC on the second control unit 2.

Afterwards, preparation completion for receiving the next data is confirmed. When an error occurs on the second control unit 2 during the transmission and the reception clock signal RXC is not converted into "high" independently, the error flag is set after a given maximum wait time (SD5).

But, when the data is received normally, a signal for requesting the next data transmission is transmitted to the second control unit 2 by converting the clock signal TXC into "high" (SC6, SD7).

When the data is completely inputted as the set data number through the above reception process, the reception process is finished, when the data is completely not inputted, after returning to the first process (SD1), the above process is repeated.

In the data reception process, when an error occurs, not receiving the data again, but the transmission data TXD and the transmission clock signal TXC are converted into "high" in order to receive the data on the check routine. Accordingly, the process returns in order to receive the data on the next check routine.

As described above, the present invention is capable of accurate data transmission and reception by transmitting the data as a certain unit and feedback-receiving the confirmation signal during the transmission, operating a first control unit voluntarily when an error occurs in a second control unit because both control units are not fixed as a master control unit or a slave control unit. But either control unit performs the master control unit function and two-way communication by transmitting-receiving the confirmation signal in accordance with the situation, and adjusting a communication data quantity or a communication rate by resetting the protocol between both control units in accordance with the communication circumstances. Accordingly, the present invention can provide a method for serial data communication which can perform the optimum communication in any communication circumstance without a circuit design alteration.

In addition, it is possible to provide normal communication between communication units having different control voltages by adding a control voltage matching circuit between both control units having different bus control voltages.

What is claimed is:

1. A method for serial data communication which transmits and receives data in two-way, comprising:
   transmitting data and a separate clock signal from a first control unit to a second control unit, at the same time checking a reception confirmation signal of the second control unit by the first control unit, wherein said transmitting data from the first control unit further includes the steps of:
      confirming whether data was received, starting the data transmission with a data transmission start signal, and receiving the reception confirmation signal from the second control unit;
      recognizing the data reception of the second control unit, and reversing the transmission start signal in order to transmit a next data;
      transmitting a transmission permission signal which permits the next data transmission to the first control unit by the second control unit; and
      feedback-receiving the transmission permission signal;
      wherein a size of the transmitted data is adjusted voluntarily in accordance with communication circumstances, and is determined in accordance with a data processing unit of the second control unit, and;
   transmitting data and a separate clock signal from the second control unit to the first control unit, at the same time checking a reception confirmation signal of the first control unit by the second control unit by checking the separate clock signal from the first control unit.

2. The method according to claim 1, wherein a transmission error occurs when the reception confirmation signal is not received.

3. The method according to claim 1, wherein a point of input time of the feedback signal which informs of the data reception and processing of the first control unit is set in accordance with a processing rate of the second control unit.

4. The method according to claim 1, wherein the transmitting process of the data reception confirmation signal and the data transmission permission signal is performed more than two times.

5. A method for serial data communication which transmits and receives data in two-way, comprising:
   transmitting data and a separate clock signal from a first control unit to a second control unit, at the same time checking a reception confirmation signal of the second control unit by the first control unit, wherein said transmitting data from the first control unit further includes the steps of:
      confirming whether data was received, starting the data transmission with a data transmission start signal, and receiving the reception confirmation signal from the second control unit;
      recognizing the data reception of the second control unit, and reversing the transmission start signal in order to transmit a next data;
      transmitting a transmission permission signal which permits the next data transmission to the first control unit by the second control unit; and
      feedback-receiving the transmission permission signal;
      wherein a point of input time of the feedback signal which informs of the data reception and processing of the first control unit is set in accordance with a processing rate of the second control unit; and
   transmitting data and a separate clock signal from the second control unit to the first control unit, at the same time checking a reception confirmation signal of the first control unit by the second control unit by checking the separate clock signal from the first control unit.

* * * * *